Figure 1:
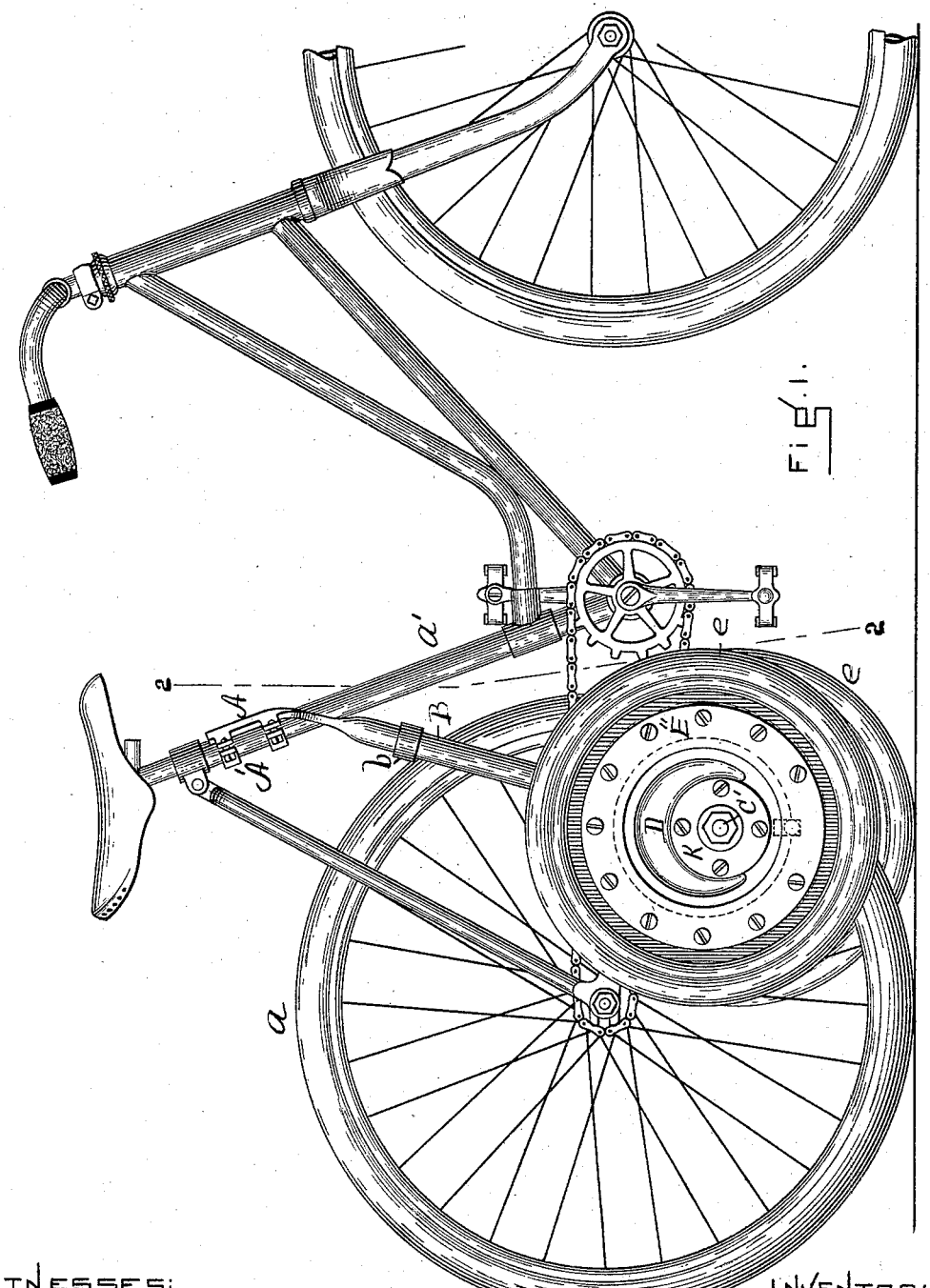

No. 611,451. Patented Sept. 27, 1898.
S. HODGSON.
ATTACHMENT FOR TRAVELING WHEELS.
(Application filed Nov. 1, 1897.)
(No Model.) 2 Sheets—Sheet 1.

WITNESSES:
INVENTOR:
Samuel Hodgson
By his Atty

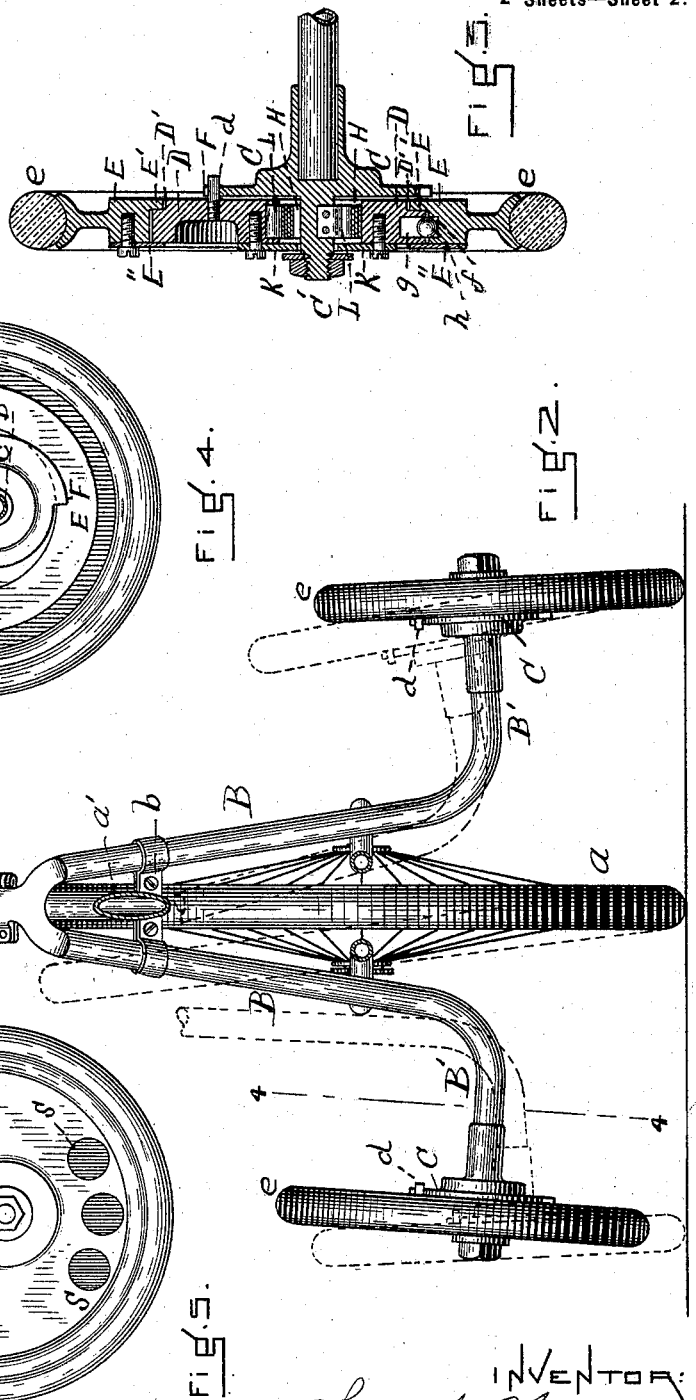

UNITED STATES PATENT OFFICE.

SAMUEL HODGSON, OF MEDWAY, MASSACHUSETTS.

ATTACHMENT FOR TRAVELING WHEELS.

SPECIFICATION forming part of Letters Patent No. 611,451, dated September 27, 1898.

Application filed November 1, 1897. Serial No. 656,995. (No model.)

*To all whom it may concern:*

Be it known that I, SAMUEL HODGSON, a citizen of the United States, residing in Medway, in the county of Norfolk and State of Massachusetts, have invented a new and useful Attachment for Traveling Wheels, of which the following is a specification.

This invention is an attachment adapted to be applied to traveling wheels—that is to say, wheels which roll or travel upon a surface, such as bicycle-wheels, in distinction from wheels which simply rotate. The invention has for its object to prevent such a wheel from falling and render it practically self-balancing, or, in other words, to balance the load upon the wheel, the exact effect of the attachment being to restore the wheel to an upright or vertical position as soon as it tips to one side or the other beyond a certain angle.

In carrying out my invention I employ an eccentric wheel or cam-wheel, which is supported by the same frame which is connected with the wheel which is to be rendered self-balancing, said eccentric wheel or cam-wheel being located at one side of the traveling wheel and at such a distance from the ground as to come in contact therewith when the traveling wheel tips beyond a certain angle. Moreover, this eccentric or cam wheel is so hung that when it is brought in contact with the ground by the tipping of the main or traveling wheel its protuberating or broadest portion—that is to say, the portion whose outer edge is farthest from the axis of the wheel—is uppermost, but is immediately rolled down by the contact of the attachment with the ground, so as to lift the traveling wheel and restore it to a vertical position, after which the eccentric or cam immediately and automatically returns to its original position, wherein the attachment is out of contact with the ground.

This invention is especially applicable to a bicycle-wheel, and is particularly useful to a learner, inasmuch as it absolutely prevents his falling, for the reason that the driving-wheel is constantly returned to a vertical position as it inclines slightly toward one side or the other. It is useful, however, as applied to bicycles, not only when they are being used by learners, but also when they are ridden by ladies, elderly people, or any others who desire to avoid the possibility of a fall.

In illustrating my invention, therefore, I have shown it as applied to a bicycle in the accompanying drawings, in which similar letters of reference indicate corresponding parts.

Figure 1 is a side elevation of a portion of a bicycle provided with my attachment. Fig. 2 is a cross-section taken on line 2, Fig. 1, showing the parts at the rear thereof in elevation. Fig. 3 is a cross-section taken centrally through one of the eccentric wheels. Fig. 4 is a section taken on line 4, Fig. 2. Fig. 5 is a side elevation showing a modification.

$a$ represents the rear or driving wheel, and $a'$ the seat-supporting post, making a part of the frame of an ordinary bicycle. Adjustably clamped at $A'$ to this post is a frame or head A, which extends into the spreading legs B, extending downward on opposite sides of the driving-wheel $a$ at a sufficient angle to avoid the pedals and then bending outward into the substantially horizontal portions B'. These legs B are preferably connected and stiffened by the brace $b$. Rigidly secured to the outer end of each of the parts B' is a flange C, from which extends outwardly the horizontal axle or shaft C'. On this axle or shaft is placed eccentrically the disk-wheel D, and around this disk-wheel is placed loosely a ring E, provided with a suitable tire $e$, preferably of rubber. (See Fig. 3.) This ring is prevented from slipping off the eccentric wheel D by means of the annular shoulder E', formed on the inner edge of the ring and extending into a corresponding recess D' on the inner edge of the periphery of the eccentric wheel, and by a ring-shaped plate E'', which is secured to the ring E and extends down over the edge of the outer surface of the eccentric wheel. The flange C is provided on its outer edge with the shoulders F, about opposite each other, and constituting stops for the pin $d$, which extends inward horizontally from that portion of the eccentric wheel in which the distance from the axle or shaft and the periphery is the greatest. (See Fig. 4.) The eccentric wheel D is provided with a central recess H, and a central ring K is secured to the outer face of the wheel, covering said recess and constituting that portion of the wheel which bears on the shaft or axle C'. A spring L lies in said recess and has one end secured to the shaft C' and the other to the wheel D. This spring L holds the protuberating portion or broadest portion of the eccentric wheel D up, as shown in Figs. 3 and 4, such portion being prevented from swinging over beyond the highest point by the pin d, which bears against the upper shoulder F. The ring E and eccentric wheel D are provided, respectively, with the recesses f and g, within which is a ball h. The recess f in the ring E has a depth which is less than the diameter of the ball h, while the recess g has a depth which is greater than the diameter of the ball. The length of the two recesses is sufficient only to receive the ball. It is evident that when the recessed portions of the ring and eccentric are down the ball h will lie partly in the recess f and partly in the recess g and thus lock the ring and eccentric together; but if the portions of the ring and eccentric provided with the recesses are up the ball h will drop into the recess g, which is deep enough to receive it wholly, and the ring and eccentric become disengaged from each other, so that the former is free to move with relation to the latter.

In practical operation when the wheel a tips while it is traveling it brings the tire e on one of the rings E into contact with the ground, as shown in Figs. 1 and 2. As the normal relative position of the parts of my attachment is that indicated in Figs. 3 and 4, when the tire e is brought into contact with the ground the ring E and eccentric wheel D are locked together by the ball h. The continued progress of the bicycle-wheel a causes the ring E to rotate, rotating with it the eccentric wheel D against the power of the spring H until the narrow portion of the eccentric wheel, which was at the moment of contact with the ground undermost, is rotated into an upper position, thus bringing the broad or protuberating portion of the eccentric wheel beneath the axle C' and lifting said axle and with it the leg B B' on that side, restoring the bicycle-wheel a to a vertical position. This one-half rotation of the ring E and eccentric D has brought the recesses g f directly over the axle, so that the ball h drops into the recesses g and frees the ring E from its engagement with the eccentric D. Thus the instant that the wheel a is righted and the device on that side slightly lifted from the ground the spring L is free to restore the eccentric to its original position by imparting a half-rotation thereto, the extent of the rotation being determined by the shoulders F and pin d. In practice the eccentric wheel may not complete a half-rotation before it is freed by the righting of the bicycle-wheel, so that practically a quick touch on the ground is sufficient to start the bicycle-wheel toward a vertical position. The devices on the opposite sides of the wheel are exactly similar, so that toward whichever side the bicycle may incline it is instantly restored to a vertical position by being lifted by the eccentric on that side.

If desired, the eccentric or cam wheel need not be surrounded by a ring, but may itself make contact with the ground, and thus act on the bicycle-wheel. Such a modified construction is shown in Fig. 5, in which the eccentric or cam wheel P is provided with its own tire and is further provided with the weights S, whereby its protuberating portion is kept in and restored to a higher position, such weights taking the place of the spring H.

As above indicated, this device or attachment may be applied to any wheel which travels along and over a surface, especially a wheel which is adapted to sustain a weight.

Having thus fully described my invention, what I claim, and desire to secure by Letters Patent, is—

1. A wheel adapted to travel over and along a surface; a frame connected therewith; and an eccentrically-hung wheel or cam supported by the frame at a short distance above said surface and on one side of the traveling wheel, said wheel being normally held with its short radius down, whereby the inclination of the traveling wheel causes the eccentric wheel or cam to rotate and thereby restore the traveling wheel to an upright position.

2. A wheel adapted to travel over and along a surface; a frame connected therewith; an eccentrically-hung wheel or cam supported by the frame at a short distance above said surface on one side of the traveling wheel, whereby the inclination of the traveling wheel toward that side causes the eccentric wheel or cam to rotate and thus restore the traveling wheel into an upright position; and a spring or its mechanical equivalent operating to normally hold the said protuberating peripheral edge in a position above the axle or shaft supporting the eccentric wheel or cam, substantially as described.

3. A wheel adapted to travel over and along a surface; a frame connected therewith; a disk supported eccentrically by the frame at a short distance above said surface and on one side of the traveling wheel; and a wheel supported on the periphery of said eccentric disk and operating when the traveling wheel inclines toward that side to rotate by its contact with the ground and to impart rotation to said eccentric disk, substantially as set forth.

4. A wheel adapted to travel over and along a surface; a frame connected therewith; a disk supported eccentrically by the frame at a short distance above said surface and on one side of the traveling wheel; a wheel supported on the periphery of said eccentric disk, the inner surface of the wheel and the periphery of the eccentric disk being coincidently recessed, but the recess in the eccentric being deeper than that in the wheel and being located in the short side of the eccentric; a ball adapted to play in said recesses and lock the wheel and eccentric together when said recesses are below the axis of the latter but drop wholly into the recess in the eccentric when said recesses are above said axis; and a spring or its mechanical equivalent operating to return the eccentric to its normal position in which its short radius is down, substantially as described.

5. A wheel adapted to travel over and along a surface; the frame B, B' supported by said wheel and extending on opposite sides thereof; horizontal shafts or axles supported by said frame on opposite sides of the wheel; the disk D supported eccentrically upon one of said axles or shafts and provided with the recess H; a spring within said recess secured at its opposite ends to the wheel and shaft and normally holding the protuberating or wider portion of the eccentric wheel above the shaft; the wheel E loose on the periphery of the eccentric disk but prevented from sidewise movement thereon; the periphery of the short side of said disk D being recessed as described and the inner surface of the wheel E being coincidently recessed; a ball adapted to play in said recesses and thereby lock said wheel and disk together when the portions containing the recesses are down; the flange C extending from the supporting frame or axle next the inner face of the eccentric wheel and provided with the shoulders F; and the pin $d$ extending from the eccentric wheel next the recessed portion of the periphery of the flange between said shoulders, substantially as set forth.

SAMUEL HODGSON.

Witnesses:
HENRY W. WILLIAMS,
A. N. BONNEY.